March 17, 1953
D. SILVERMAN ET AL
2,632,150
MARINE SEISMIC SURVEYING
Filed Feb. 23, 1949
2 SHEETS—SHEET 1
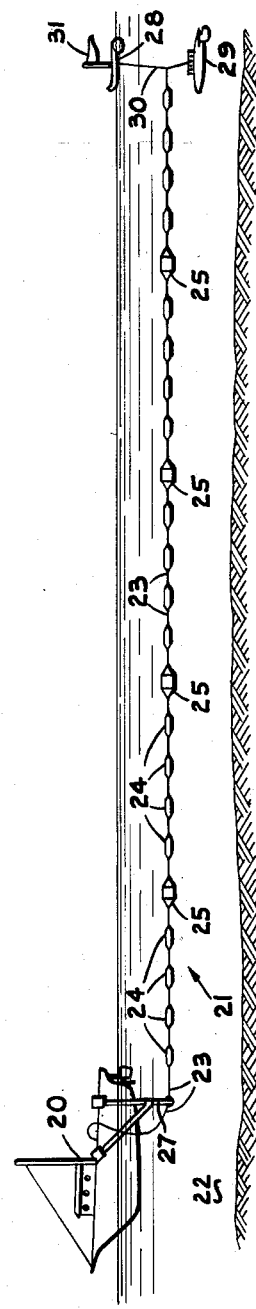
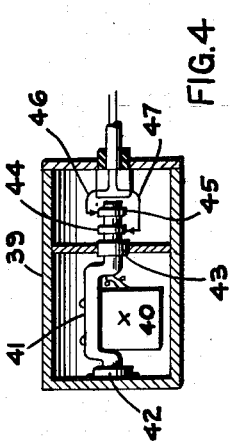
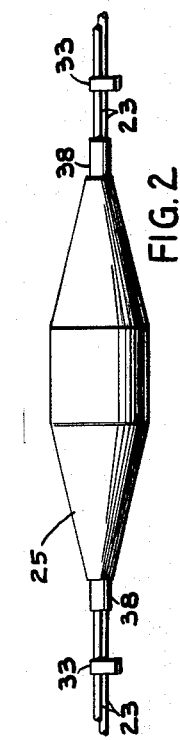
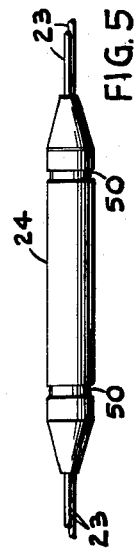
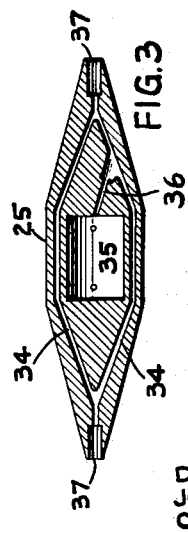
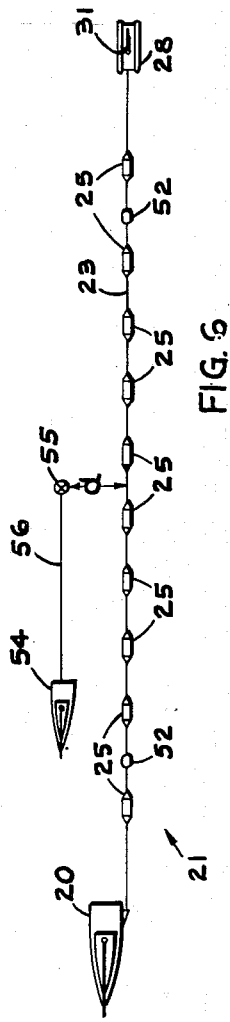
DANIEL SILVERMAN
JOSEPH D. EISLER
CHARLES C. LASH
  INVENTORS
BY *Newell Pottoff*
ATTORNEY March 17, 1953  D. SILVERMAN ET AL  2,632,150
MARINE SEISMIC SURVEYING
Filed Feb. 23, 1949  2 SHEETS—SHEET 2
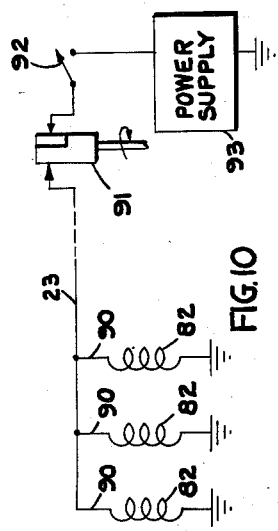
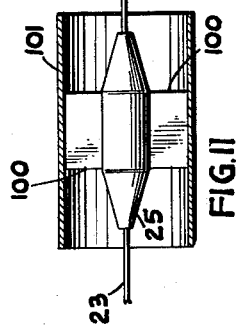
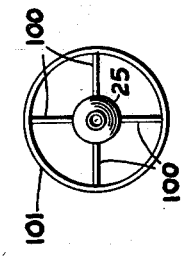
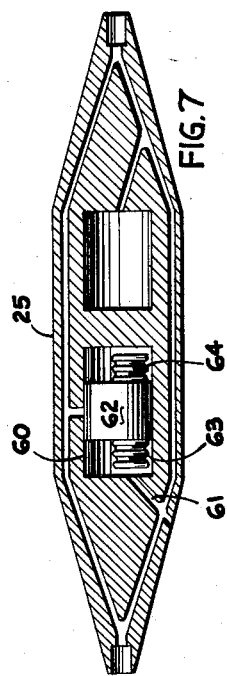
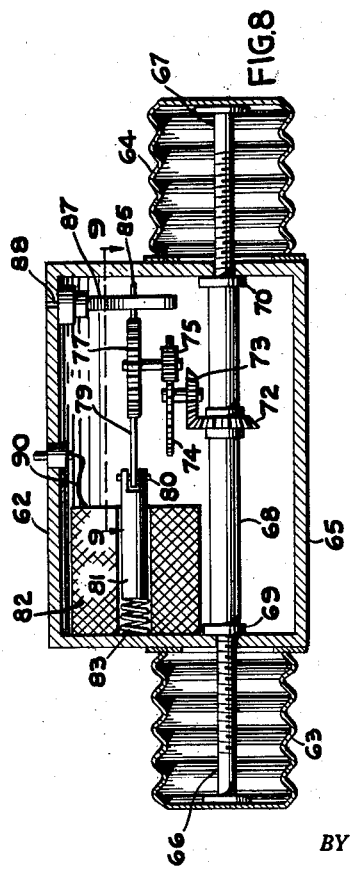
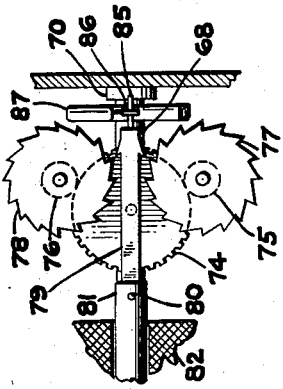
DANIEL SILVERMAN
JOSEPH D. EISLER
CHARLES C. LASH
  INVENTORS
BY Newell Pottoff
  ATTORNEY Patented Mar. 17, 1953

2,632,150

UNITED STATES PATENT OFFICE 2,632,150

MARINE SEISMIC SURVEYING

Daniel Silverman, Joseph D. Eisler, and Charles C. Lash, Tulsa, Okla., assignors to Stanolind Oil and Gas Company, Tulsa, Okla., a corporation of Delaware Application February 23, 1949, Serial No. 77,942

3 Claims. (Cl. 340—3)

This invention relates to geophysical surveying and is directed particularly to prospecting by seismic methods over water-covered areas such as in the Gulf of Mexico.

Geophysical surveying using artificially created seismic waves has been extensively and successfully used on land for a number of years, but it is only comparatively recently that the method has been applied to off-shore exploration for oil and gas, particularly in the Gulf of Mexico. In the earliest applications of the seismic method to marine areas, the shots and detectors were individually spaced on or under the marine floor in much the same manner as in prospecting on land. The results obtained were generally similar to those for land prospects.

With the improvement and adaptation of specific techniques and instruments for marine work, the speed of prospecting by this method has increased so markedly over what was previously possible on land that, as a result, more than the normal ratio of geophysical effort in marine prospecting has been concentrated on the seismic method, as compared with magnetic and gravimetric methods, for example.

Both now and in the past one of the difficult problems has been the proper handling of the seismometers used for detecting the seismic waves. Placing the seismometers at known locations in a spread on the marine floor, as in land prospecting, proved even more laborious and time-consuming than on land. Towing a spread of seismometers connected together by a conductor and tension cable along the marine floor or supported on floats behind the recording vessel from one location to another, and shooting either with the seismometers on the marine floor or supported from the floats, have resulted in a marked increase in the speed of geophysical surveying coverage. However dragging of the seismometer spread along the sea bottom presents obvious hazards both to the equipment itself and to the marine life and installations on the marine floor. Employing seismometers at or very near the surface and supported by surface floats results in the picking up of a great deal of noise, even under favorable conditions of low wind velocity and relatively smooth water surface. Even in calm seas the noise picked up by float-supported, near-surface detectors is such as to mask most of the desired weaker reflections, while on windy days and when the water surface is rough, the noise may be so strong as to override all reflections and make prospecting impossible. As a matter of fact, there are some seasons of the year when the noise conditions from the water surface have been so troublesome that prospecting operations in the Gulf of Mexico were possible only a small fraction of the time. The resultant delays while the crews and equipment are held in readiness for favorable working conditions add very greatly to the expense of the prospecting operation.

It is accordingly a primary object of our invention to provide a method and apparatus for marine seismograph prospecting which gives a greatly improved signal-to-noise ratio, permitting detection of deeper and weaker desired reflection signals. Another object is to provide a method and apparatus of this type in which the seismometer spread is maintained or controlled at the most effective depth for receiving signals by seismometers. A further object is to provide a marine seismograph prospecting method and apparatus which can operate and obtain good geophysical data under adverse conditions of weather and water such that usable geophysical data could not hitherto be obtained. Still another object is to provide a marine seismometer spread which is easily handled both in and out of the water, and which exerts a relatively small amount of drag on a towing vessel. A still further object is to provide a seismic-wave detector spread which may be used independently of the presence of or the conditions on the sea bottom either for towing the spread or for the placing of the detectors. Another and still further object is to provide a marine seismometer spread employing a minimum of equipment at the water surface where a great deal of the adverse noise signals appear to originate. Still another and further object is to provide a marine seismometer spread having good discrimination or filtering against the transmission of longitudinal vibrations along the towing cable. Another and still further object is to provide a marine seismometer spread which will permit the detection of seismic signals while the spread is in motion while being towed, so that the seismometers do not have to come perfectly to rest. Other and further objects, uses and advantages of our invention will become apparent as this description proceeds.

From observations made under a variety of conditions, we have now found that the range of depths in water where seismometers may be placed for the most efficient operation is relatively narrow. Due to the greatly different seismic-wave transmission properties of water and air, reflected or refracted seismic waves traveling upward from the earth below the water to the surface of the water are almost totally reflected there. As a result, there is a strong probability of interference between succeeding waves in a seismic wave train at a depth in the water which is one-quarter of the average seismic wave length in that medium. Consequently, to avoid this possible interference which changes the "character" or appearance of the detected waves, it is desirable to locate the seismometers as close as possible to the water surface. It is at this surface that the displacements are maximum, and the possibility of interference is a minimum.

We have observed, however, as was briefly indicated above, that the noise level in the seismic wave band is a maximum at the water surface, and we have noticed further that this noise level drops off very sharply with depth. There is, accordingly, for the optimum operation of seismometers a narrow range of depths below the zone of surface noise and above the depth at which interference effects become pronounced for waves of interest in the seismic band. This range extends from about 5 to about 15 feet, with the preferred depth of operation at which quite consistently good records are obtained, being about 10 feet.

It is of course often possible, at the expense of including more or less noise in the recorded signals, to operate at depths less than about 5 feet and somewhat within the zone of surface noise, when for some reason such as shallowness of the water it is necessary or desirable to do so. Also, it is conceivable that useful results such as the emphasis of certain reflections, first arrivals, and the like would be attained by deliberately choosing an operating depth where interference of a selected frequency in the seismic-wave band would occur. This invention offers a ready method of operating at any such desired depth in the water, either outside of or within the 5- to 15- foot range which is presently preferred.

Accordingly, the foregoing enumerated and other objects are accomplished by a towable marine seismometer spread which is designed to operate at a closely controlled depth of around 10 feet without any support or connection to the water surface near any of the seismometer locations by which noise could be introduced into the seismic signals. According to one embodiment of our invention the desired depth control is achieved by first adjusting the buoyancy of the cables, seismometers, and supporting floats very closely to a neutral value averaged over any substantial portion of the total spread length, and then towing the whole assembly from a tow point submerged at the desired depth. Then in the absence of positive or negative buoyant forces, the whole seismometer spread streams directly back from the tow point at the same depth and tends to remain at that depth when the forward motion of the vessel and spread is slowed more or less or even completely stopped briefly for recording seismic waves. In another embodiment the seismometers, cables, and supports are of only approximately neutral buoyancy, and means sensitive to the seismometer depth apply an additional or correcting force to bring the seismometers to the desired depth. In both embodiments, it will be observed that the seismometers are entirely free of any support or control located at the water surface directly above. Consequently, any possible noises from this as a source are absent.

This will be better understood by reference to the accompanying drawings, forming a part of this application, in which like numerals are applied to the same or corresponding parts in the different figures. In these drawings:

Figure 1 is a cross-section of a body of water through which a spread embodying the invention is being towed by a vessel;

Figures 2 and 3 are respectively elevation and cross-section views of a seismometer-supporting float;

Figure 4 is a cross-section view of a seismometer trunnion mounting and water-tight housing;

Figure 5 is a view of a cable-supporting float;

Figure 6 is a plan view of a complete spread and shooting apparatus operated in accordance with our invention;

Figure 7 is a cross-section view of a seismometer float with an additional depth-control means;

Figure 8 is a cross-section view of the automatic depth-control device of Figure 7;

Figure 9 is a partial cross-section of the apparatus of Figure 8 along the lines 9—9;

Figure 10 is a wiring diagram, illustrating the operation of the device of Figure 8; and Figures 11 and 12 are respectively a cross-section and an end view of a modified seismometer float.

Referring now to these drawings in detail, and to Figure 1 in particular, a vessel 20 is shown towing a spread 21, constructed in accordance with our invention, through a body of water 22. Spread 21 consists of a tension and conductor cable 23, having cable-supporting floats 24 spaced at intervals along its length, and a plurality of seismometer-containing floats 25 also spaced at intervals along it. The forward end of cable 23 is attached to a spar 27 extending downwardly from vessel 20 into the water, the point of attachment of cable 23 being at the desired depth of operation, between 5 and 15 and preferably about 10 feet. To the trailing end of spread 21 is attached a float 28 and a weight or sinker 29, connected by a cable 30, the point of attachment of cable 23 to cable 30 being also at the desired depth. Float 28 carries a flag 31 which may be sighted from vessel 20 to indicate the position of the end of spread 21 so that its direction may be ascertained at all times, particularly in the presence of cross-currents. In the event cable 23 breaks or is accidentally cut in two, float 28 prevents possible loss of the severed portion of the spread. Although this end assembly of spread 21 serves to maintain the entire cable in tension and acts as a depth control on that end, it may be omitted, particularly if the total length of spread 21 is small. The drag of the cable itself and of the floats is often sufficient to create all the tension needed.

In accordance with our invention, the spacing and buoyancy of the cable floats 24 and the seismometer floats 25 are arranged or adjusted to bring the over-all buoyancy of the spread, as well as of any substantial portion of it, as nearly as possible to a neutral value in water 22. Then, as vessel 20 proceeds along its course, the seismometer floats 25 remain at the desired depth of about 10 feet and in the absence of any substantial buoyancy forces do not change this depth appreciably within a reasonable time interval when the towing is slowed down or stopped for making a record. With the streamlined design of spread shown, it is frequently possible to record seismic waves while the spread is moving at a substantial speed if the desired reflections can override the increased noise level. Drag 28 serves to prevent cable 23 from sagging too much between the points supported by the floats 24; nevertheless, there is still a small amount of sag in the unsupported portions of this cable, which is an advantage in that they act to reduce the transmission of longitudinal vibrations along the length of the cable. Because of these unsupported cable portions, spread 21 has a certain resilience or springiness in that it seeks to become shorter as the towing force is lessened.

One of the seismometer floats 25 is shown in more detail in Figures 2 and 3. As shown in Figure 2, the float is elongated and provided with pointed ends so as to stream easily through the water. The buoyancy of float 25 with its associated cable and seismometer is preferably adjusted by adding or removing small straps of lead 33 from cable 23 where it enters or emerges from float 25. As is seen in Figure 3 which shows float 25 in cross-section, its interior is provided with one or more slots or passages 34 through which the cable or cables 23 are threaded from end to end, and a central chamber 35 which houses the seismometer assembly. A lead-in slot 36 extending between the cable slot 34 and chamber 35 provides for a splice and a lead-in cable from the conductor cable 23 to the seismometer housing. Enlarged openings 37 to the cable slots 34 at each end of the float 25 provide space for resilient sleeves 38 which prevent too sharp bending and breakage of cable 23 when it enters and leaves the float.

A suitable seismometer assembly is shown in Figure 4. Inside a watertight cylindrical housing 39 a seismometer 40 is trunnion-mounted in a frame 41 set in a pair of anti-friction bearings 42 and 43, the axis of the trunnion being parallel to the spread direction. The electrical leads from seismometer 40 are brought out to a pair of slip rings 44, 45, contacted by brushes 46 and 47, which are connected to leads in cable 23 through the water proof splice housed in channel 36. Being free to rotate about the axis provided by bearings 42 and 43 and having its center of gravity at $x$ below the bearing axis, seisometer 40 remains upright at all times despite any rotation of float 25 about cable 23 as an axis. Rotations about axes perpendicular to the cable 23 are generally negligible because of the cable tension created by towing spread 21 through the water and because of the symmetrical construction of floats 25.

In Figure 5 is shown a typical cable-supporting float 24. This, like the seismometer float 25, is made in two halves clamped together around cable 23 as by means of metal bands 53 or otherwise suitably held together by means of bolts or screws.

The plan view of Figure 6 shows a complete spread and auxiliary shooting vessel in the relative positions occupied during normal operation. For simplicity the cable floats 24 have been omitted from this drawing and only the seismometer floats 25 are shown. In a typical spread there may be, for example, ten seismometers, with the two seismometers at each end spaced between 50 and 100 feet apart with a depth gauge unit 52 located midway between them. The spacing of all the other seismometers may be a uniform interval of 150 to 300 feet.

In a typical method of operation with this equipment, vessel 20 and spread 21 are accompanied along a parallel course by an explosives vessel 54 which places an explosive charge 55 and pays out a firing line 56. The location of charge 55 may be offset from the line of spread 21 by any suitable distance $d$, for example, about 300 feet. As the center of spread 21 approaches the line from charge 55 perpendicular to the spread direction, vessel 20 is slowed down and stopped briefly. As soon as the forward motion of the spread is sufficiently reduced, and before the seismometer-containing floats 25 have had time to change depth appreciably, the explosive 55 is fired, and the seismic-wave record is made. The readings of the electric meters indicating remotely at the recording vessel the response of the depth gauges 52 at the time of recording are noted but are not necessarily automatically recorded. As soon as the record is completed, vessel 20 immediately resumes towing and proceeds on its course to the next shooting location.

In the modification of our invention shown in Figures 7, 8, 9, and 10, the requirement of exact initial adjustment of the buoyancy of each float 25 is less stringent. As shown in Figure 7, the float 25 is provided with a second compartment 60 open to the surrounding water through one or more passages 61 and containing a variable buoyancy unit 62. Unit 62, completely sealed and filled with a gaseous atmosphere, is provided with a pair of expansible bellows 63 and 64 which are capable of varying its enclosed volume and accordingly changing the buoyancy of float 25 as a whole.

A simple mechanism for automatically controlling this buoyancy unit 62 as a function of depth so that it holds the float 25 at the desired operating depth is shown in Figures 8 and 9. Unit 62 comprises a water-tight housing 65 to which one end of each of the bellows 63 and 64 is sealed. These bellows are expanded and contracted by a pair of oppositely threaded rods 66 and 67 fixed to the free ends of the bellows, which rods respectively cooperate with internal right- and left-handed threads on the ends of a tube 68 held between a pair of thrust bearings 69 and 70 in the housing 65. Tube 68 is rotated by an attached bevel gear 72 which is engaged by a bevel gear 73 driven by a spur gear 74. Gear 74 engages a pair of spaced gears 75 and 76 attached to a pair of oppositely-toothed ratchets 77 and 78.

As shown in Figure 9, in the space between ratchets 77 and 78 is a double-toothed pawl 79 pivotally attached by a pin 80 to the end of a ferromagnetic solenoid core 81 surrounded by a solenoid coil 82 and urged outwardly from the coil by a compression spring 83. The free end of pawl 79 is provided with a thin flexible stem 85 slidable lengthwise through a sleeve 86 attached to the free end of a Bourdon tube pressure element 87 which is exposed through an opening 89 to the hydrostatic pressure of the water surrounding float 25. By a suitable insulated electrical lead 90 passing through the wall of casing 65 solenoid 82 is connected (Figure 10) through a conductor in the cable 23, an interrupting switch 91, and an "on-off" switch 92 to a suitable power supply 93 located on the towing vessel 20. The other terminal of the coil 82 and of the power supply 93 may be either grounded or connected to a separate return lead in the cable 23. A plurality of such coils 82, each associated with a different float 25, may be connected in parallel as shown in Figure 10.

This constitutes a relatively simple mechanism responsive to depth of submergence of the float 25 and automatically varying its buoyancy to cause float 25 to rise or sink toward the preferred depth. Thus, when the unit is at the desired depth, Bourdon tube 87 positions the pawl 79 exactly in the center between ratchets 77 and 78. Accordingly, reciprocation of the plunger 81 by pulses of current through solenoid 82 from power supply 93, with switch 92 closed and interrupter 91 in operation, produces no rotation of either ratchet. However, when the unit 25 is either above or below the desired depth, pawl 79 is positioned by Bourdon 87 so that the appropriate one of ratchets 77 or 78 is turned by the reciprocation of pawl 79. Thus the direction of turning of gear 74 and hence of threaded tube 68 is determined by whether float 25 is above or below the desired depth. As long as float 25 is incorrectly located in the water, the action of one or the other of ratchets 77 or 78 continues to expand or to contract the bellows 63 and 64, and by thus varying the displacement of the unit 62, brings the float 25 back to the desired depth.

If this depth-regulating mechanism is allowed to run continuously, mechanical noise due to its operation or electrical noise due to the energizing current pulses will often appear on the seismic record. In order to prevent this, the switch 92 at the recorder is opened just before and remains open during the making of a record. With the buoyancy of each seismometer-containing float 25 having been automatically brought and maintained very close to neutral at the operating depth, the depth changes during the ensuing few seconds required for making the seismic record are quite insignificant.

It will be noted that the speed of operation of this mechanism is in part variable with the amount of correction required. Thus, if pawl 79 is moved by Bourdon 87 far off center due to the unit being at a considerable distance from the desired depth, several of the teeth of one of the ratchets 77 or 78 are engaged with each stroke. It will be understood that in practice the spacing of the ratchet teeth is normally much closer than can be shown in this figure. However, when only a minor correction is needed fewer ratchet teeth are engaged, and the rotation of the ratchet 77 or 78 with each stroke of the pawl is only a fraction of that when the depth deviation is large. Further, the speed of attaining the initial buoyancy adjustment can be increased by operating interrupter switch 91 at a fairly high speed. After the initial balance is once obtained, it can be maintained by applying only a few pulses per minute to the solenoid 82.

This type of depth control, varying by small increments the resultant buoyancy of the seismometer-containing float 25, appears to be the most desirable type where recording is done with substantially no forward motion of the spread through the water. However, other means of operating depth control, without having noise-generating floats or the like at the water surface above the spread, are applicable to this problem. In particular, if recording is done with the spread in forward motion or very promptly when such motion ceases, depth- (or pressure-) controlled external vanes on the float 25, making it rise or submerge in the water to attain the proper depth during towing, may be employed. Such vanes, being horizontal, would also act to oppose and slow down vertical movements of float 25 as it seeks to change its depth in the water.

In Figures 11 and 12 is shown a modification of the seismometer float 25 which requires less accuracy in initial balancing to neutral buoyancy. Fixed to the outer surface of float 25 and extending radially are a plurality of longitudinal vanes 100 which carry at their outer extremities a cylindrical sheet-metal sleeve 101. Sleeve 101 is open at the ends and thus does not appreciably affect the towing qualities of float 25 or the spread as a whole. Nevertheless, the laterally projected area of this sleeve, which is important to its motions through the water perpendicular to its longitudinal axis, being much larger than of the float 25 alone, is effective to slow down considerably the rising or falling of the float 25 in case its buoyancy is not exactly adjusted to the desired neutral value.

While we have thus described our invention in terms of the foregoing specific embodiments thereof, it is to be understood that this is merely for purposes of illustration and that other and various modifications of the invention will occur to those skilled in the art. For example, any number of seismometers and any other spacing pattern other than that described in detail could be used. Instead of the rigid floats shown, elongated and inflated flexible floats either fastened to or surrounding the spread cable 23 could be employed. Likewise, although only the seismometer floats 25 have been described as automatically depth-controlled by the application of varying forces to attain neutral buoyancy at the desired operating depth, the same type of control could, alternatively or in addition, be applied to floats on the cable between the seismometers. The invention, therefore, is not to be considered as limited to the exact described details, but is to be ascertained from the scope of the appended claims.

We claim:

1. The method of seismic surveying in water-covered areas which comprises proceeding with a recording vessel along a given course through the water, applying from said vessel at a depth between 5 and 15 feet a towing force to a spread comprising a plurality of spaced seismometers connected by a tension and conductor cable and supported by spaced buoyancy units giving said spread approximately neutral buoyancy throughout, whereby said spread streams directly back from the point of application of said towing force at a substantially uniform depth, automatically varying, in response to changes in water pressure with depth, the buoyancy of at least some of said units spaced along said spread to maintain said spread within the 5 to 15-foot range of depths, discontinuing the application of said towing force as said spread approaches a desired recording location, discontinuing said automatic buoyancy-varying step, generating seismic waves when the forward motion of said spread has substantially ceased, and recording the resultant seismic waves reaching said seismometers before they have passed out of the 5 to 15-foot range of depths.

2. A towable seismometer spread for marine seismic surveying comprising a tension and conductor cable, a plurality of seismometers spaced along said cable and connected to conductors therein, a plurality of spaced buoyant supporting floats attached to and distributed along said spread, the resultant buoyancy of all portions of said spread having an approximately neutral value in the water, and means for automatically varying the buoyancy of the float associated with each of said seismometers comprising: a sealed container having a variable volume, means for varying the volume of said container, and pressure-responsive means controlling the amount and direction of operation of said volume-varying means to vary said container volume in the same sense as the pressure varies.

3. A towable seismometer spread for marine seismic surveying comprising a tension and conductor cable, a plurality of seismometers spaced along said cable and connected to conductors therein, a plurality of spaced buoyant supporting floats directly attached to and distributed along said spread, means associated with said floats to adjust their buoyancy to bring all substantial portions of said spread to an approximately neutral density in the water, depth-responsive means for automatically applying additional forces at a plurality of points along said spread between its ends to maintain said seismometers at a substantially constant depth of 5 to 15 feet in the water, and means to interrupt the operation of said depth-responsive means during the reception of seismic waves by said seismometers.

DANIEL SILVERMAN.
JOSEPH D. EISLER.
CHARLES C. LASH.

REFERENCES CITED

The following references are of record in the file of this patent:

UNITED STATES PATENTS

| Number | Name | Date |
| --- | --- | --- |
| 1,470,733 | Hayes | Oct. 16, 1923 |
| 2,203,894 | Cooke | June 11, 1940 |
| 2,241,428 | Silverman | May 13, 1941 |
| 2,283,200 | Flude | May 19, 1942 |
| 2,324,378 | Flude | July 13, 1943 |
| 2,423,591 | Flude | July 8, 1947 |
| 2,440,903 | Massa | May 4, 1948 |
| 2,465,696 | Pasalay | Mar. 29, 1949 |
| 2,570,707 | Parr | Oct. 9, 1951 |